July 6, 1948.　　　　C. F. VOYTECH　　　　2,444,714
PACKAGE-TYPE SEAL
Filed Sept. 7, 1946
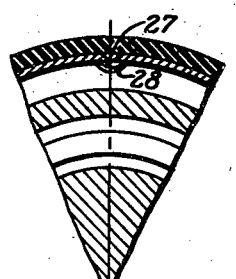
Fig.2.
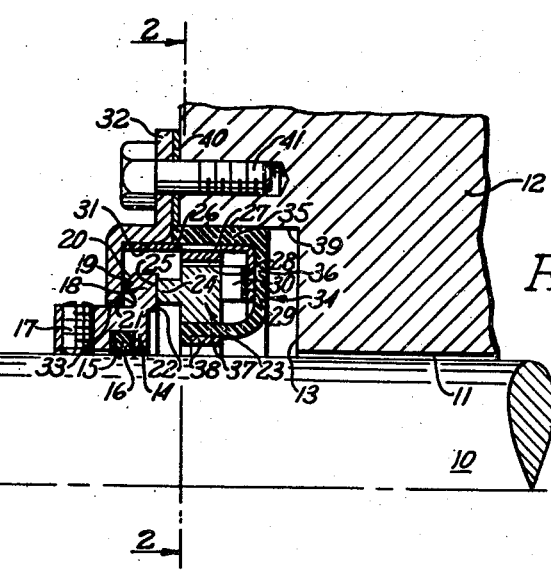
Fig.1.
Fig.3.
Fig.4.
INVENTOR.
Charles F. Voytech
BY Patented July 6, 1948

2,444,714

UNITED STATES PATENT OFFICE 2,444,714

PACKAGE-TYPE SEAL

Charles F. Voytech, Chicago, Ill., assignor to Crane Packing Company, Chicago, Ill., a corporation of Illinois Application September 7, 1946, Serial No. 695,439

12 Claims. (Cl. 286—11)

This invention relates to fluid seals for relatively rotatable parts such as a shaft and a housing therefor.

The principal object of this invention is to provide a simple fluid seal for relatively rotatable elements which is of a package-type, i. e., all the parts thereof are assembled at the seal manufacturer's factory so that the entire seal may be handled as a single unit and installed by the user merely by sliding the package over a shaft or the like and securing one part of the seal to the housing and the other part to the shaft.

A more specific object of this invention is to simplify the construction of package-type seals to the end that the seal itself will occupy very little space, will be made of a minimum number of parts which are easily fashioned and assembled and will be less expensive to the consumer.

These and other objects of this invention will be made more clear by the following detailed description when taken together with the accompanying drawings, in which Fig. 1 is a section through a seal embodying the present invention, together with fragments of a shaft and housing with which the seal is used;

Fig. 2 is a fragmentary elevation taken along the line 2—2 of Fig. 1;

Fig. 3 shows more in detail the spring used in the seal of Fig. 1; and

Fig. 4 is a modification of the seal of Fig. 1 adapted for use with a helical-type spring.

For purposes of illustration this invention will be described with reference to its application to a shaft which is to be sealed with respect to a housing through which it passes. It is understood that the seal may be used to prevent the flow of fluid between any two relatively rotatable machined parts one of which passes through a portion of the other.

It has been generally agreed that the most efficient seal for relatively rotatable machine parts is the type known as a mechanical seal which embodies two rings with radially disposed contacting surfaces, one of which rings is secured and sealed with respect to one of the relatively rotatable elements and the other ring is flexibly mounted on, but likewise sealed with respect to, the other relatively rotatable elements. The first-mentioned ring is axially fixed and the other, being flexibly mounted, is adapted to move axially to compensate for wear and for any axial vibrations which may be imposed upon it. Each ring has associated therewith a number of supporting parts and it has been customary to so construct the seal that each ring and its associated parts are separate and distinct units, each of which must be installed separately and then adjusted so that a proper spacing between the two units is had. In many designs, the parts associated with each ring are not fastened together so that the customer must install each part individually in proper relation to the next. If due regard is not made for a proper spacing of the rings, either the rings will not be pressed together to form a running seal, or the spring pressure used to hold the rings in contact with one another will be either excessive or insufficient, both conditions being undesirable in the seal.

The seal of this invention seeks to combine all the necessary elements of a seal into a single unit in such a way that when installed the proper spacing is automatically provided without any attention or effort on the parts of the man installing the seal and that all that is required to complete the installation of the seal is to secure the ring associated with the rotatable part to that part and the remainder of the seal to the stationary housing.

Referring now to Fig. 1 for a detailed description of the invention, there is shown a shaft 10 which passes through an opening 11 in a housing 12 which may be a machine frame or the like, said housing having a recess 13 therein in communication with shaft 10. The part of the seal which rotates with shaft 10 is shown at 14 and in the form selected for illustration is comprised of a ring which encircles the shaft and is provided with an internal groove 15 into which is compressed a resilient deformable ring 16 of rubber, either synthetic or natural or a combination of the two. Said ring 16 may have a circular radial cross-section as shown, but it is not necessary that this configuration be used, it merely being necessary to effect a fluid-tight seal between ring 14 and shaft 10, and any packing capable of performing this function will be suitable—however, the rubber-like ring 16 with a circular radial cross-section possesses the characteristic of increasing its sealing effect with increasing pressure and hence may be more desirable where high pressures are encountered. One or more set screws 17 are provided in ring 14 to lock said ring on shaft 10 and thus to prevent relative rotation between the ring and shaft.

Ring 14 is provided with a flange 18 extending radially outwardly from the right-hand end (Fig. 1) of the ring, said flange having a knife-edge 19 formed on one side by beveling the outer corner 20 of the flange and forming a groove 21 at the interior corner. The opposite side of the flange projects axially from the body of the ring and is formed with a radially disposed sealing surface 22 which is made perfectly flat and smooth by any suitable means such as grinding, lapping or the like.

Cooperating with ring 14 is a washer 23 having an annular rib 24 extending toward flange 18 on ring 14, said rib having a radially disposed surface 25 which is likewise rendered perfectly flat and smooth by grinding, lapping or a similar operation so as to form a fluid-tight running connection between ring 14 and washer 23. A rigid tube 26 encircles washer 23 and forms a support therefor, said tube 26 having a plurality of lugs 27 formed therein which extend radially inwardly into correspondingly formed slots 28 in the outer periphery of washer 23. One lug and slot are shown more clearly in Fig. 2.

The right-hand end (Fig. 1) of tube 26 is formed with a flange 29 which extends radially inwardly and is axially spaced from washer 23. Spring means 30 which, as shown in Fig. 3, may be comprised of a series of small cantilever springs secured by means of rivets 31 or the like to flange 29 are used to urge washer 23 toward ring 14 at all times. It is understood that other forms of springs may be used in place of the cantilever spring shown and that the space between flange 29 and washer 23 may be made greater to accommodate heavier or longer springs.

Tube 26 is preferably pressed into the cylindrical wall 31 of a recess in a plate 32. The press-fit is such that the joint between the tube and wall 31 is fluid-tight. The plate 32 may be a circular stamping having a central aperture as at 33 which is smaller in diameter than the outside diameter of flange 18 on ring 14 such that said ring will be held in approximately a central position with respect to the plate at all times. The length of tube 26 is so chosen that when the tube and its associated washer are assembled with respect to plate 32 and ring 14 the correct spacing is automatically secured between the washer and flange 29 so that spring 30 is compressed to its calculated working height.

A seal is effected between washer 23 and tube 26 by means of a flexible resilient sealing element 34 which is comprised of a cylindrical part 35 encircling tube 26, a radial part 36 abutting on flange 29 of tube 26 and an inner cylindrical part 37 which telescopes within the washer 23. A rigid band 38 is used to clamp the inner cylindrical part 37 to washer 23 to make a fluid-tight joint thereat.

The parts thus far described comprise the entire seal as it is made by the seal manufacturer. It is a complete unit or package and may be shipped and handled very readily without in any way damaging the running surfaces 22 and 25, and without fear that the various component parts thereof will come apart.

When the seal is installed it is slipped over shaft 10 from the left-hand side as viewed in Fig. 1 and moved back along the shaft until the cylindrical part 35 of the flexible sealing element 34 enters recess 13 of housing 12. The cylindrical wall 39 of the recess is so dimensioned relative to the outside diameter of cylindrical part 35 that a press-fit is secured. This completes the seal between washer 23 and tube 26 and in addition effects a seal between tube 26 and housing 12. A gasket 40 is inserted between housing 12 and plate 32 and the plate is then made secure with respect to housing 12 by means of a plurality of bolts 41 or the like. Where the fluid pressure in recess 13 is not very great, the bolts may be disposed with and the plate 32 relied upon merely as a stop, the friction between cylindrical wall 35 and wall 39 being sufficient to hold the assembly in place. Set screws 17 are then tightened upon shaft 10 and the seal is ready for use.

If desired, the space between tube 26 and washer 23 may be filled with a grease or other lubricant at the factory so that the seal will require no further attention after it is installed.

Fig. 4 shows a modification of the seal of Fig. 1 wherein a different type of sealing element is used so that a stronger spring can be applied to the washer. In this modification similar parts will be given like reference characters. Thus, there is shown a shaft 10 passing through an aperture 11 in the housing 12 having a recess 42 which is longer than recess 13 in Fig. 1. Ring 14 and plate 32 are identical in all respects with the corresponding ring 14 and plate 32 of Fig. 1. Washer 43, however, is slightly different and it is mounted in a tube 44 which is pressed into recess 31 to form a fluid-tight connection thereat. Tube 44 is formed with a cylindrical section 45 of reduced diameter. Washer 43 is sealed with respect to tube 44 by a flexible resilient sealing element 46 made of rubber, either natural or synthetic or a combination of the two, having a cylindrical part 47 pressed against the interior of cylindrical part 45 of tube 44 by means of a rigid band 48. Said sealing element 46 has a diaphragm 49 extending radially inwardly from cylindrical section 47 and terminating in a flange 50 which abuts on washer 43. Flange 50 is held in contact with washer 43 by means of a helical spring 51, one end of which bears against a ferrule 52 which in turn bears against flange 50 and the other end of spring 51 being held by a rigid cup 53 having a flange 54 extending radially outwardly towards cylindrical section 45 on tube 44. Said flange 54 abuts on a snap ring 55 held in a suitable groove in tube 44 so that the spring pressure is transmitted back to tube 44. It is contemplated that the press-fit between tube 44 and plate 32 at 41 is sufficiently strong to resist the spring pressure.

Flange 54 on cup 53 serves as an abutment for band 48 and cylindrical section 47 on the sealing element 46. Thus when the seal is assembled the snap ring is first put in place in its grove and the cup is then slipped into tube 44 from the left as viewed in Fig. 4, until flange 54 rests against snap ring 55. Next, spring 51 is inserted into cup 53 and a rubber sealing element 46 is assembled with respect to a band 48 and a ferrule 52 and the sub-assembly so formed is then slipped into the reduced portion 45 of tube 44 from the left-hand end. Washer 43 is inserted into the tube, care being taken to align lugs 27 with slots 28, following which ring 14 is inserted into tube 44 and finally tube 44 is pressed into recess 31 in plate 32. Alternatively, sealing element 46 and band 48 may be slipped into tube 44 first, from the right-hand end and ferrule 52, spring 51, cup 53 and snap ring 55 installed in the order mentioned from the same end.

If desired, after the unit or "package" above described is installed in a machine, the space between the exterior of reduced section 45 and the cylindrical wall of the recess 42 may be packed with a suitable sealing compound or packing, although in the average installation this will not be necessary since a seal is effectively produced between plate 32 and housing 12 by a gasket 40. As in the Fig. 1 design, the space between tube 44 and washer 43 may be packed by the seal manufacturer with a suitable grease or other lubricant so as to render unnecessary any further attention to the seal by the user or the manufacturer of the machine.

It will be noted that in both forms flange 18 on ring 14 contacts plate 32 with a knife-edge 19. This is done to facilitate the wearing away of the contacting surface or surfaces on the plate and ring 14 so that a space is provided therebetween which will permit leftward axial movement of the ring with respect to the plate. It will be noted that plate 32 is rigidly secured to housing 12 and ring 14 is likewise rigidly secured to shaft 10 so that if the two are initially assembled in contact with one another, relative axial movement between the ring and plate is impossible in the left-hand direction, but it is of course possible in the opposite direction. By forming the contacting surfaces in such a manner as to facilitate wear between them, a space is gradually formed which will permit ring 14 to move to a limited extent to the left and thereby decrease the resistance to rotation which might be created by the friction between the ring and plate and also decrease the shock which might arise from axial vibrations.

Alternatively, when the seal is installed, ring 14 may be moved slightly toward the right, as viewed in Figs. 1 and 4, away from plate 32 before set screws 17 are tightened upon shaft 10. This will insure any amount of axial freedom which may be deemed necessary for proper functioning of the seal without in any way destroying its character as a complete packaged unit.

It is understood of course that other means may be used to secure ring 14 to shaft 10 and accordingly the scope of this invention is not to be limited to the form of ring shown for illustrative purposes. It is understood, further, that the scope of the invention is not to be limited to the other parts shown but is to be determined by the appended claims.

What is claimed is:

1. A self-contained seal device for effecting a fluid-tight seal between relatively rotatable elements, one of said elements having a recess therein, said seal comprising a ring encircling the other of the relatively rotatable elements, means for sealing the ring with respect to the encircled element, a radially extending flange on the ring, said flange having a sealing surface on one side, means for preventing relative axial movement between the ring and the element encircled thereby; an apertured plate encircling the ring, said aperture being of smaller diameter than the outside diameter of the flange and adapted to contact the side of the flange opposite the sealing surface, a recess in the plate, a tube in the recess in the plate and sealed with respect to the plate, a resilient compressible sealing element having a cylindrical wall in contact with a portion of the tube and adapted to be compressed against the tube, a sealing washer within the tube and having a sealing surface adapted to bear against the sealing surface on the flange of the ring, means for effecting a fluid-tight joint between the washer and sealing element, means for preventing relative rotation between the washer and tube, and resilient means for urging the washer toward the ring.

2. A self-contained seal device for effecting a fluid-tight seal between relatively rotatable elements, one of said elements having a recess therein, said seal comprising a ring encircling the other of the rotatable elements, means for sealing the ring with respect to the encircled element, a radially extending flange on the ring, said flange having a sealing surface on one side and an axially disposed circular knife-edge on the other side, means for preventing relative axial movement between the ring and the element encircled thereby, an apertured plate encircling the ring, said aperture being of smaller diameter than the outside diameter of the flange, a recess in the plate, a tube in the recess and sealed with respect to the plate, a resilient compressible sealing element having a cylindrical wall in contact with a portion of the tube and adapted to be compressed against the tube, a sealing washer within the tube and having a sealing surface adapted to bear against the sealing surface on the flange of the ring, means for effecting a fluid-tight joint between the washer and sealing element, means for preventing relative rotation between the washer and tube, resilient means for urging the washer toward the ring, and means for securing the plate to the recessed relatively rotatable element, the recessed plate being held against the knife-edge by the last-mentioned resilient means to position the ring relative to the tube.

3. A self-contained seal device for effecting a fluid-tight seal between relatively rotatable elements, one of said elements having a recess therein, said seal comprising a ring encircling the other of the relatively rotatable elements, means for sealing the ring with respect to the encircled element, a radially extending flange on the ring, said flange having a sealing surface on one side, means for preventing relative axial movement between the ring and the element encircled thereby, an apertured plate encircling the ring, said aperture being of smaller diameter than the outside diameter of the flange and adapted to contact the side of the flange opposite the sealing surface, an annular recess in the plate adjacent the ring and having a cylindrical wall therein, a tube telescoped at one end into the recess and sealed with respect to the plate by a press-fit with the cylindrical wall of the recess, a resilient compressible sealing element having a cylindrical wall in contact with a portion of the tube and adapted to be compressed against the tube, a sealing washer within the tube and having a sealing surface adapted to bear against the sealing surface on the flange of the ring, means for effecting a fluid-tight joint between the washer and sealing element, means for preventing relative rotation between the washer and tube, resilient means for urging the washer toward the ring and means for securing the plate to the recessed relatively rotatable element.

4. A self-contained seal device as described in claim 1, said tube having a radially inwardly extending flange at one end and said resilient means for urging the washer toward the ring comprising a spring abutting on one side against said flange and on the other side against the washer.

5. A self-contained seal device as described in claim 1, said tube extending into the recess in the said one of the relatively rotatable elements and being radially spaced therefrom, and said cylindrical wall of the compressible resilient sealing element being compressed between the tube and the said one of the relatively rotatable elements in the recess therein.

6. A self-contained seal device for effecting a fluid-tight seal between relatively rotatable elements, one of said elements having an annular recess therein concentrically disposed with respect to the other relatively rotatable element, said seal comprising a ring encircling the outside of the other relatively rotatable element, means for sealing the ring with respect to the encircled element, a radially extending flange on the ring, said flange having a sealing surface on one side and an axially extending circular knife-edge on the other side, means for preventing relative axial movement between the ring and the element encircled thereby, an apertured plate encircling the ring, said aperture being of smaller diameter than the outside diameter of the flange, a recess in the plate of annular form concentric with and adjacent to the ring, a tube in the recess in the plate, said recess having a cylindrical wall and said tube having one end telescoped therein with a press-fit to provide a fluid-tight joint between the tube and plate, a resilient compressible sealing element having a cylindrical wall in contact with a portion of the tube and adapted to be compressed against the tube, a sealing washer within the tube and having a sealing surface adapted to bear against the sealing surface on the flange of the ring, means for effecting a fluid-tight joint between the washer and sealing element, means for preventing relative rotation between the washer and tube, resilient means for urging the washer toward the ring, and means for securing the plate to the recessed relatively rotatable element, the knife-edge being held against the recessed plate by the last-named resilient means to position the ring relative to the tube.

7. A self-contained seal device as described in claim 6, the recess in the said one relatively rotatable element having a cylindrical wall which is spaced from the tube and the cylindrical wall of the resilient compressible sealing element being compressed between the tube and the cylindrical wall of the recess in the said one relatively rotatable element.

8. A self-contained seal for effecting a fluid-tight seal between relatively rotatable elements, one of said elements having an annular recess therein encircling an opening upon the other said relatively rotatable elements, said seal comprising a ring encircling the other of the relatively rotatable elements, means for sealing the ring with respect to the encircled element, a radially extending flange on the ring, said flange having a sealing surface on one side, means for preventing relative axial movement between the ring and the element encircled thereby, an apertured plate encircling the ring, said aperture being of smaller diameter than the outside diameter of the flange and adapted to contact the side of the flange opposite the sealing surface, a recess in the plate, said flange being retained within the recess, a tube in the recess in the plate and sealed with respect to the plate, a resilient compressible sealing element having a cylindrical wall in contact with a portion of the interior of the tube, a band compressing said cylindrical wall of the sealing element against the tube to effect a fluid-tight seal therebetween, a sealing washer within the tube and having a sealing surface adapted to bear against the sealing surface on the flange on the ring, a radially inwardly disposed flange on the sealing element abutting on the washer, means for preventing relative rotation between the washer and tube, an abutment fixed with respect to and carried by the tube, and a helical spring compressed between the flange on the resilient sealing element and the abutment.

9. A self-contained seal device as described in claim 8, a portion of the tube contacted by the cylindrical wall of the resilient compressible sealing element being of lesser diameter than the remainder of the tube such that a shoulder is formed, and said washer being disposed within the tube in the region of larger internal diameter such that the shoulder limits axial movement of the washer in one direction.

10. A self-contained seal device as described in claim 8, said tube having a groove formed therein, a snap ring in the groove, and means for holding the helical spring, said spring holding means comprising an apertured cup having an outwardly extending flange abutting on the snap ring, said cup serving to center the spring with respect to the remainder of the seal device.

11. A self-contained seal device as described in claim 8, said tube having an annular groove therein, a snap ring retained in the groove, a spring holder comprising an apertured cup having a radially outwardly extending flange at one end abutting on the snap ring, said band for clamping the cylindrical wall of the compressible sealing element to the tube abutting on the radially outwardly extending flange of the cup so as to be positioned thereby.

12. A self-contained seal device for effecting a fluid-tight seal between relatively rotatable elements, one of said elements having an annular recess therein encircling the other of the relatively rotatable elements and opening thereon, said seal comprising a ring encircling the other of the relatively rotatable elements, means for sealing the ring with respect to the encircled element, a radially extending flange on the ring, said flange having a sealing surface on one side and an axially disposed circular knife-edge on the other side, means for preventing relative axial movement between the ring and the element encircled thereby, an apertured plate encircling the ring, said aperture being of smaller diameter than the outside diameter of the flange, an annular recess in the plate, said flange being disposed within said recess in the plate, a tube having one end pressed into the recess so as to be sealed with respect to the plate, said tube having a portion of reduced diameter such that a shoulder is formed in the tube, a resilient compressible sealing element having a cylindrical wall in contact with the portion of reduced diameter of the tube, a rigid band compressing the cylindrical wall against the tube, a sealing washer within the tube and having a sealing surface adapted to bear against the sealing surface on the flange on the ring, said compressible sealing element having a radially inwardly disposed flange, said portion of reduced diameter of the tube having an annular groove on the interior thereof, a snap ring retained in said groove, a spring holder comprising an apertured cup having a radially outwardly disposed flange abutting on the snap ring, a helical type spring disposed within the cup and having one end abutting on the bottom of the cup and the other end reacting against the radially inwardly disposed flange on the sealing element so as to compress the sealing element flange against the washer to form a fluid-tight joint therebetween, means for preventing relative rotation between the washer and tube, and means for securing the plate to the recessed relatively rotatable element.

CHARLES F. VOYTECH.

REFERENCES CITED

The following references are of record in the file of this patent:

UNITED STATES PATENTS

| Number | Name | Date |
|---|---|---|
| 2,009,154 | Waseige | July 23, 1935 |
| 2,076,716 | Fretter | Apr. 13, 1937 |
| 2,247,505 | Kohler | July 1, 1941 |
| 2,347,118 | Matter | Apr. 18, 1944 |